May 7, 1940.                S. C. HETH ET AL                2,199,629
                        COMBINATION HARVESTER-THRASHER
                        Filed March 11, 1937          3 Sheets-Sheet 3
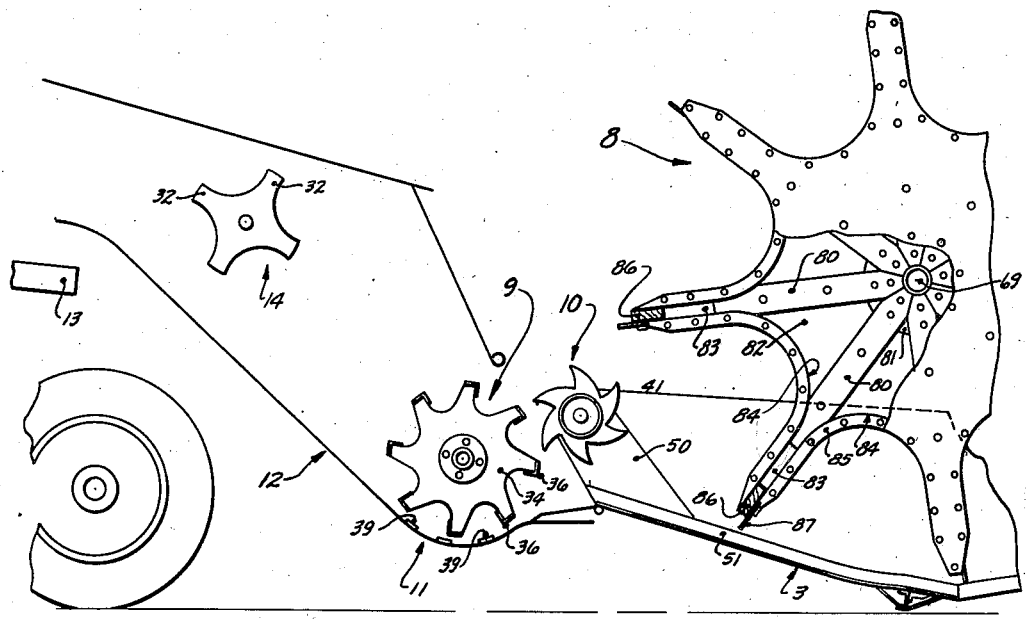
Fig. 3
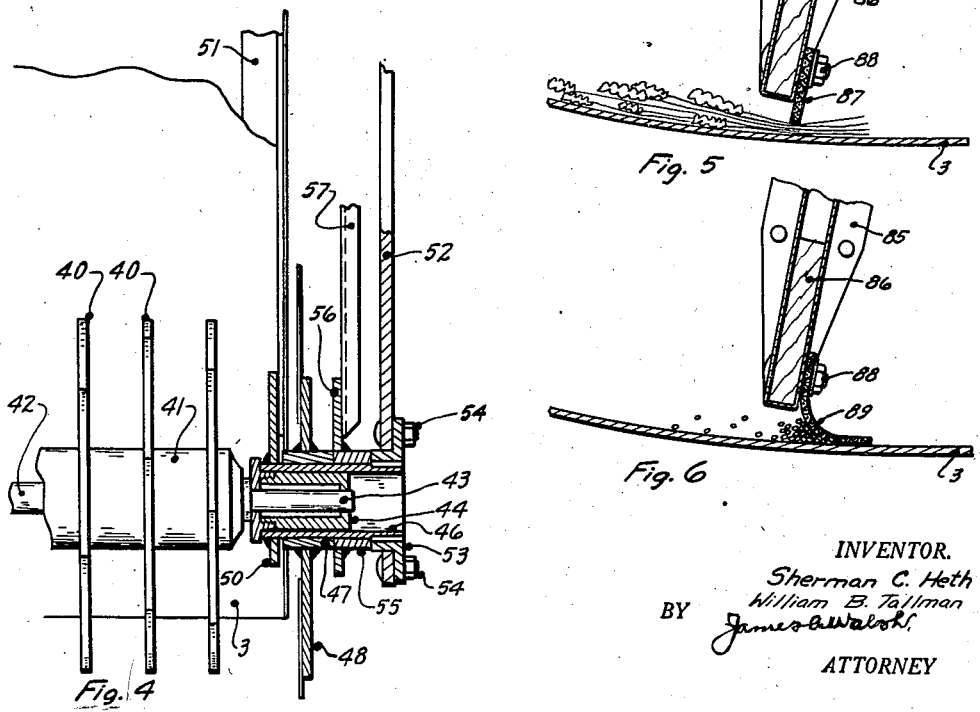
Fig. 4
Fig. 5
Fig. 6
INVENTOR.
Sherman C. Heth
William B. Tallman
BY James A. Walsh
ATTORNEY Patented May 7, 1940

2,199,629

UNITED STATES PATENT OFFICE 2,199,629

COMBINATION HARVESTER-THRESHER

Sherman C. Heth and William B. Tallman, Racine, Wis., assignors to J. I. Case Company, Racine, Wis., a corporation Application March 11, 1937, Serial No. 130,257

17 Claims. (Cl. 56—123)

The present invention relates to combination harvester-threshers, and an object of the invention is to generally improve the construction and operation of devices of this type.

A further object is to provide such a machine which will be small, light, and economical to purchase, operate and maintain.

A further object is to simplify such machines, while at the same time improving their efficiency.

Further objects are to provide such a machine in which the reel is arranged to feed the cut material into the cylinder, obviating other means of feeding; means for assisting the flow of material from the cylinder upwardly to the separating mechanism; a special construction of reel adapted for the above purposes; supporting means for such a reel; and other expedients for the realization of the above objects, which will be apparent from the following specification and accompanying drawings, in which:

Fig. 3 is a vertical sectional view on the line 3—3 of Fig. 2 with parts broken away to show interior construction.

Fig. 4 is a sectional view on the line 4—4 of Fig. 1.

Fig. 5 is a view, much enlarged, of a portion of Fig. 3, illustrating the action in certain types of grain.

Fig. 6 is a similar view of a slightly modified arrangement adapted for other grains, showing the action.

Similar reference characters have been applied to the same parts throughout the drawings and specification.

Figure 1:
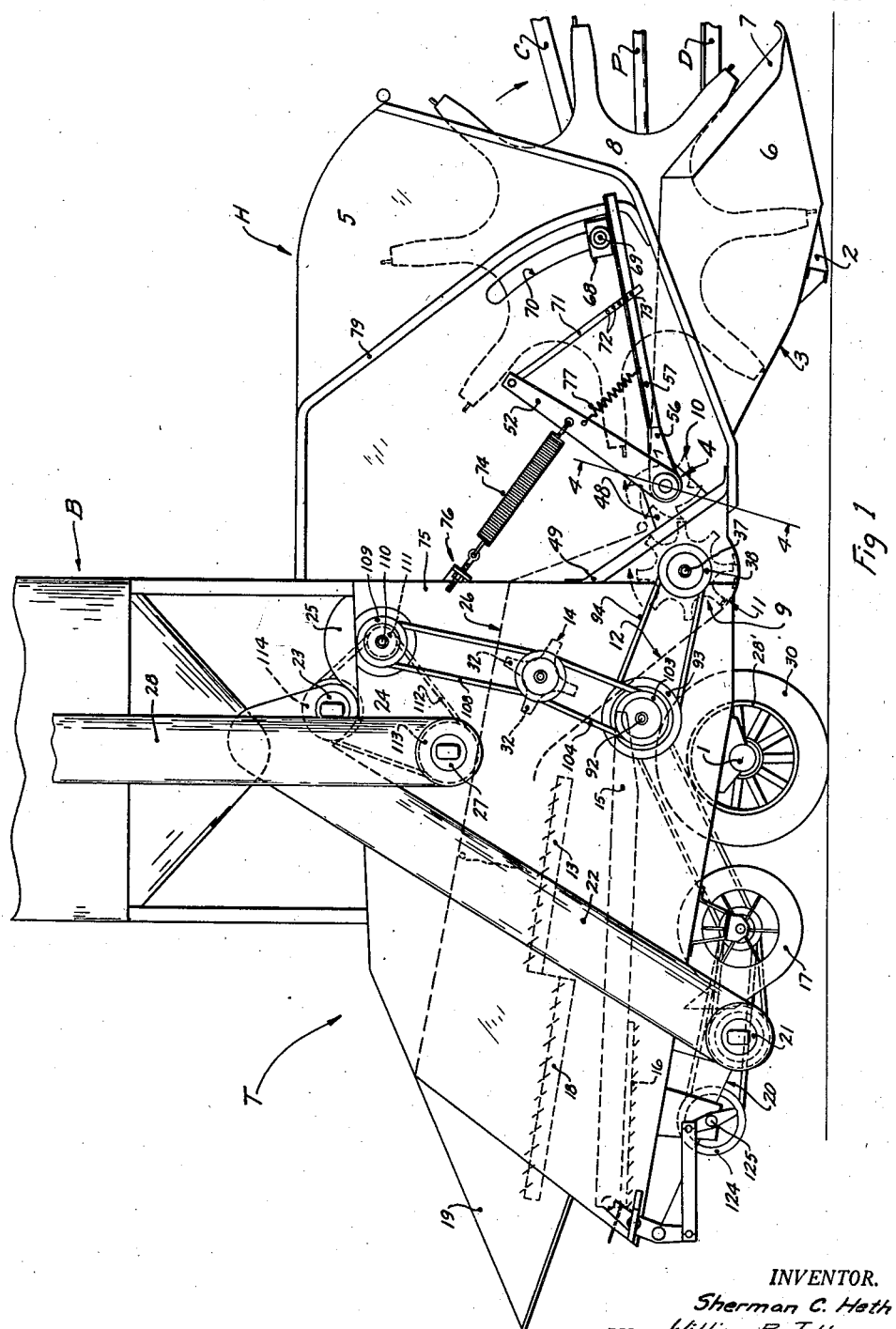
Figure 1 is a side elevation of a machine illustrating the invention.

The machine belongs to the class of small combines of the so-called balanced type, and, as seen in Fig. 1, comprises a harvester portion H and a thresher-separator portion T, the whole being approximately balanced on a single axle structure 1, from which extends a forward reaching drawbar D for attachment to a tractor, not shown, the machine trailing behind the tractor in somewhat the manner of a binder. A grain bin B is supported above the machine, and substantially directly over the axle 1 so that its weight, whether empty or full, does not materially affect the balance of the machine. The mechanism of the machine is driven from the engine on the tractor through a power take-off shaft P of suitable or well-known form, and the cutter-bar may be raised or lowered from an operator's position on the tractor by means of a header control C.

More particularly, the machine includes a cutter-bar 2, of usual or suitable form, actuated from the power source P, and located at the forward edge of a platform 3 of special form, pivoted at 4 to a housing or hood structure generally designated as 5. The platform has side wings 6—6, and gathering points 7—7, cooperating in the usual manner with a reel, generally denoted as 8, to gather the standing material and present it to the cutter-bar.

The reel, in the present instance, in addition to the above, sweeps the platform 3 and carries the cut material thereover, and into position to be drawn into the cylinder, generally designated as 9. Any material which may have lodged on the reel is removed by a stripper roll or rotor 10 which rotates at a greater peripheral speed than the reel. The stripper operates in close proximity to the cylinder, which, by its rapid rotation, tends to continuously clear the stripper.

Material fed to the cylinder is threshed between it and a concave 11, and thrown by the rotation of the cylinder up a floor 12 to a straw-rack portion 13 which is suitably agitated, the movement of the material being assisted and accelerated by a beater or the like 14, rotating a short distance above the floor. The straw gradually works rearwardly on rack portion 13, the grain and chaff falling through to the grain pan 15, along which it works rearwardly to a cleaning shoe 16 on which it is winnowed by a blast from a cleaning fan 17. From straw-rack portion 13 the straw passes to a second straw-rack portion 18, and any grain still in the straw falls through, either directly to the cleaning shoe 16 or to pan 15, from which it is discharged onto the shoe. The straw falls from the rear of rack portion 18 directly to the ground, the rear of the machine being protected from wind etc. by a hood 19.

From shoe 16 the grain falls through to a pan 20 and gravitates to a transverse auger conveyor 21 which collects it and delivers it to an elevator 22, which, in turn, raises it along the side of the machine to an auger conveyor 23, which distributes it to a recleaner of usual or suitable construction and generally denoted by numeral 24, having a fan 25, and which occupies some of the space above the deck 26 of the separator. The several units blend into a well-proportioned whole.

From the recleaner the grain is gathered by a transverse auger conveyor 27, and elevated in an elevator 28 to grain bin B, from which it is emptied from time to time in the usual or a suitable manner.

Returning to a somewhat more detailed description of the various parts, axle structure 1 is carried on wheels 28' and 29 (Fig. 2) which may be desirably provided with pneumatic tires 30 and 31, respectively, thus saving the machine from a large amount of racking, and permitting higher speed, both of operation and transportation.

The parts of the separator, namely, straw-racks 13 and 18, grain pan 15, cleaning shoe 16, augers 21, 23, 27, elevators 22 and 28, recleaner 24, etc. may be of any suitable type, and in themselves form no part of the present invention, and require no further description, except to say that the cylinder, straw-racks, cleaning shoe, and, of course, the housing and hood 19, are all of a width corresponding substantially to the length of the cutter-bar 2, so that there is no converging of the cut material before it reaches the cylinder.

The straw passes entirely through the machine in a thin even sheet from which the grain is much more readily shaken than is the case with material that has been pressed together and possibly tangled more or less in undergoing one or more changes in direction.

Figure 2:
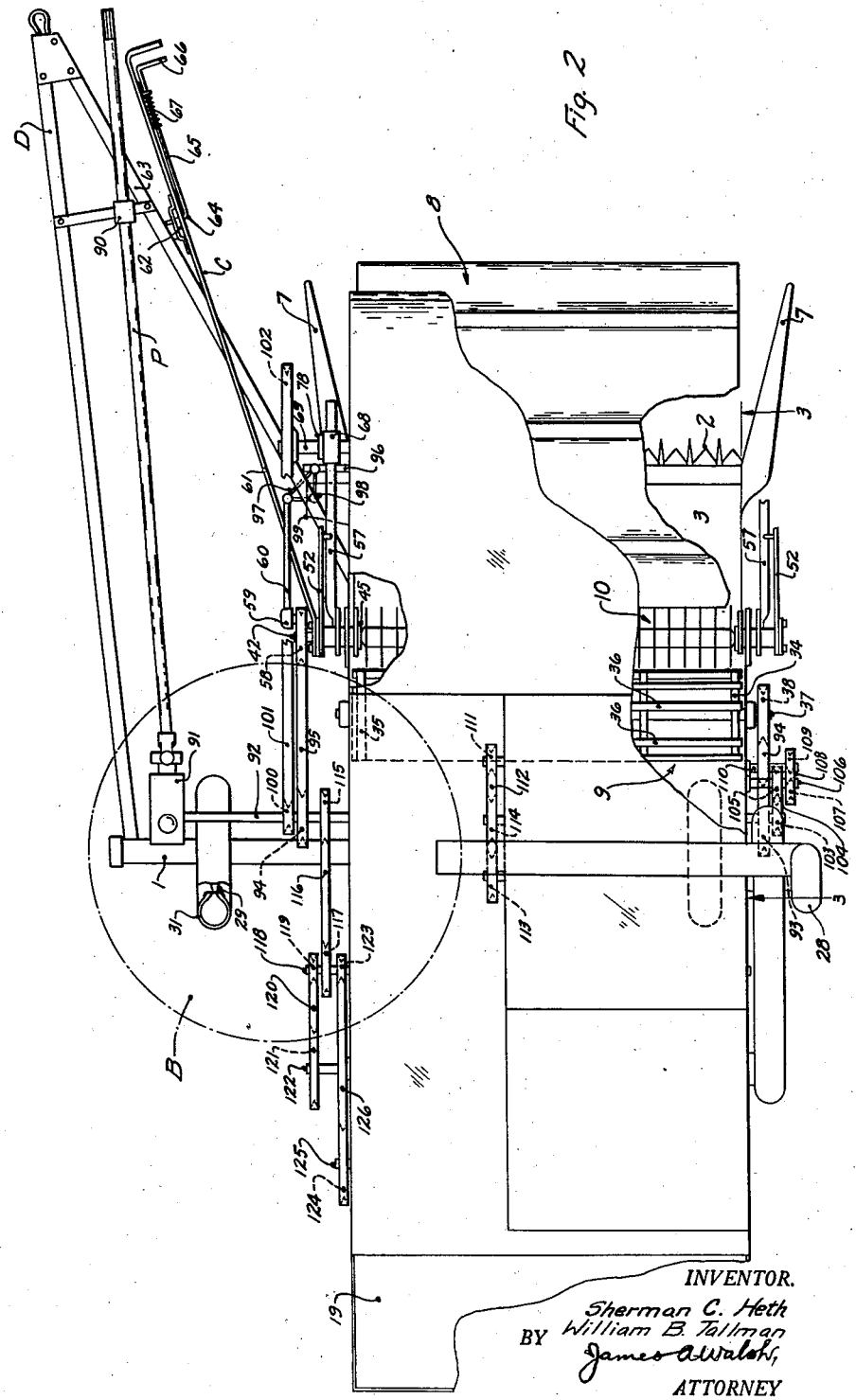
Fig. 2 is a plan view of the same with parts removed and others broken away to show interior features.

Grain bin B, as suggested in Fig. 2, is arranged substantially over the stubble wheel 29, the weight thereof, near the path of travel of the tractor, materially reducing the side draft, and substantially eliminating any tendency of the machine to skid around into line with the tractor when operating on soft or slippery ground.

Beater 14 may be of suitable or usual form, in the present instance having four wings or blades 32—32, which, in rotating, engage the material and tend to impel it up the slope of floor 12. The material is impelled from cylinder 9 with considerable force, and, under some circumstances, beater 14 may be omitted and this force depended upon entirely.

Cylinder 9 may be of special construction, and, in the present instance, as shown in Figs. 2 and 3, is of the "flail" type, comprising plates 34, 35 connected by bars 36—36 which engage the material and thresh the grain without shredding the straw, or extracting any substantial amount of moisture from any green material which may be picked up by the cutting mechanism. The plates 34, 35 are fixed on a shaft 37 by which the cylinder is driven through a pulley 38 fixed on the shaft. Bars 36—36 pass in close proximity to bars 39—39 of concave 11, which retard the material and provide for a better impact of the cylinder bars therewith.

Stripper rotor 10 may be of any suitable type, in the present instance comprising a series of star-wheels 40—40, as best shown in Fig. 4, carried on a core or the like 41, supported in any suitable manner by a shaft 42, conveniently extending through the core and terminating in journals such as 43 carried in suitable bearings 44, Fig. 4 and 45, Fig. 2, which are carried on common centers with the pivots of platform 3 and the supporting means for reel 8. In this manner it is insured that the relation of the stripper to the reel and platform will not change when the platform and reel are raised or lowered.

Bearing 44 is supported in a sleeve 46, which is in turn supported in a stationary sleeve 47 suitably fixed in a plate 48 carried by the frame of the machine, being, in the present instance, fixed to a brace 49, Fig. 1, firmly anchored to the machine structure. Sleeve 46 carries a plate 50, rigidly anchored thereto, as by welding, to which is fastened an angle iron or the like 51 constituting part of the framing of platform 3, adjustments of the height of the platform being accompaned by changes in the position of sleeve 46. The sleeve rotates easily in sleeve 47, and a counterbalance arm or lever 52 is fixed to the outer end of sleeve 46 in any suitable manner, for example through a flange 53 splined to the sleeve, and to which the arm is connected as by bolts 54—54. Counterbalancing force applied to the arm is accordingly communicated to the platform.

Sleeve 46 also has a collar 55 journaled thereon, and to which is affixed, as by welding, a plate 56, having, suitably fastened thereto, an arm 57 extending forwardly to support one end of reel 8.

Sleeve 46 and its associated mechanism, as will be understood, is substantially duplicated at the other end of stripper 10, except, as shown in Fig. 2, shaft 42 extends outwardly through the sleeve, and carries a pulley 58, and a crank-pin 59 actuating a pitman 60 for reciprocating the cutter bar. The crank-pin may conveniently be mounted on the pulley, and the fact that the center about which the pin revolves is the same as that of the pivot for adjustment of platform 3, insures that there will be no disturbance of the throw of the crank caused by adjustments of the platform.

For adjusting the platform a hand lever 61, constituting above mentioned header control C, may be affixed to flange 53 on the left side of the machine, and extend forwardly into a position where it may be conveniently grasped by an operator on the tractor. The position of the lever may be maintained by a segment 62 fixed on an element 63 of draw-bar D, a suitable detent 64 interlocking with the segment, and being controlled by a rod 65 and grip 66, the pawl being urged into engagement with the segments by a spring 67. Reel supporting arms 57—57, at their forward ends, carry bearings 68—68, in which is journaled the shaft 69 of reel 8. Swinging of arms 57—57 about shaft 42 will accordingly cause up-and-down adjustment of the reel. The shaft moves in slots 70—70 in the sides of housing 5.

Arms 57—57 are supported from counterbalance arms 52—52 by means of rods 71—71, pivoted at their upper ends to the counterbalance arms, and extending through suitable openings in arms 57—57, as shown in Fig. 1. The rods have apertures 72 therein through which a stop, pin or the like 73 may be inserted for preventing movement of the rod through the arm in one direction. Thus arms 57 are supported in a predetermined position below arms 52—52, but the former may rise independently of the latter if, for example, a relatively large mass of material is momentarily trapped between the reel and platform, arms 57 sliding on rods 71 to permit this.

To lighten the load on lever 61, counterbalancing springs 74—74 are arranged between arms 52—52 and a convenient part of the frame of the machine, 75, a suitable form of adjustable connection 76 being provided at one end of the spring to provide for obtaining the desired amount of counterbalancing effect. The proportion of the weight of the parts imposed on the lever may thus be adjusted to the desired value. Other counterbalancing springs 77—77 are arranged between arms 52 and 57 for supporting part of the weight of the reel 8. While these springs are not strong enough to raise the arms 57 clear of the pins 73, they reduce the stresses in the reel and platform when material is trapped as above suggested. The nominal height of the real above the platform may be adjusted by placing pins 73 in different holes 72 in the rods 71. End play of the shaft 69 may be prevented by collars or the like 78.

The framing for hood 5 includes braces 79, Fig. 1, which are curved in the region of arms 57 substantially on a radius about center 4, so that the outer extremities of the arms are guided on the braces and reenforced against being displaced by side movement of the machine, for example, when traveling over rough ground.

Reel 8 may be of any suitable type, but in the present instance an enclosed type of reel is used, as the same is particularly effective in serving the function of feeding the cylinder, which is part of the purpose of the reel in the present machine. As particularly shown in Figs. 3, 5, and 6, the reel is built up on a frame of radial elements 80—80 fixed to a flange 81 fast on shaft 69, the members 80 conveniently being arranged in contact with a head 82 of suitable sheet material and having arms or teeth 83—83 projecting therefrom. This structure constitutes one end of the reel, and is duplicated at the other end, in each case the elements 80—80 being arranged to be enclosed in the completed structure. The space between the two heads is enclosed by U-shaped panels 84—84, of suitable sheet material, the heads 82 and the U-shaped panels being fixed together at their edges by suitable means such as flanges and rivets, as at 85. The completed structure resembles a large hollow gear with a wide face and very narrow teeth. For reenforcing the teeth or blades, braces, or slats 86 are arranged within the outer edges of the teeth thus strengthening them at the point where the chance of damage is greatest. This type of reel will handle large amounts of material with extremely little likelihood of the same being caught and wound around the reel.

Sweeps 87 of suitable flexible material are arranged on the extremities of the teeth 83, being held in place preferably on the following side of the teeth by bolts or the like 88, and substantially closing the clearance normally allowed between the teeth and platform 3. This renders it unnecessary to operate the reel dangerously close to the platform, while preventing the sliding of material off the platform when it is adjusted to a low position. The fabric will readily yield in the event that a solid object is presented between the reel and platform, and damage to either is usually avoided.

For certain conditions, for example in harvesting soy beans, where a material part of the grain is knocked from the vines by the impact of the reel, and vibration of the cutter-bar, and particularly where, at the same time, it is necessary to operate with an extremely low setting of the cutter-bar and platform, sweeps such as 89, Fig. 6, are used. These are sufficiently wide to brush or rub the platform 3. The loose beans are caught by the sweeps, and prevented from rolling back over the cutter-bar to be lost on the ground. It is generally advisable to have the sweeps of the type of 89 of thinner, more flexible material than those of the type of 87.

The drives to the various units of the machine may be of any suitable type, and in themselves form no part of the present invention, and various arrangements may be used within the contemplation thereof. In the illustrative embodiment the power take-off shaft P may be supported in a suitable bearing 90, carried on the draw-bar, and the shaft extends into a gear housing 91 which may be carried on axle structure 1, the shaft driving, through suitable gearing of well-known type within the box, a shaft 92 extending entirely through the machine. On the grain side of the machine, shaft 92 has a pulley 93, which drives, through a belt 94, above mentioned pulley 38 on the cylinder shaft 37. Shaft 92 also carries, on the stubble side of the machine, a pulley 94, which drives above mentioned pulley 58 on shaft 42 of stripper roll 10 through a belt 95.

It is to be noted that pulley 58 does not change its position upon adjustments of cutter-bar 2, so that the belt maintains its adjusted tension without difficulty.

Pitman 60 actuates the sickle 96 of the cutter-bar through a bell-crank 97, fulcrumed on a pin or the like 98, fixed on a bracket 99 or other suitable support carried by platform 3. The details of this type of sickle actuation being well known, and forming no part of the present invention, it is not considered necessary to describe it further. The drives to the remaining rotative elements of the machine may be of any suitable or well-known type, and, conveniently, all the drives from shaft 92 may be of the V-belt type, as this type of drive is light, noiseless, and suitable for a combine, the belts being unlikely to be thrown off the pulleys if the machine should slope, or even be racked momentarily out of line by rough ground.

A pulley 100 on shaft 92 drives, through a belt 101, a large pulley 102 fixed on the reel shaft 69, and suitable or well-known means such as an idler, not shown, may be provided for insuring a proper tension on the belt in various adjusted positions of the reel.

Shaft 92, Fig. 1, has a pulley 103, driving, through a belt 104, a pulley 105, Fig. 2, on the shaft 106 of beater 14. Shaft 106 carries, also fixed therewith, a pulley 107, driving, through a belt 108, Fig. 1, a pulley 109, fixed on the shaft 110 of recleaner fan 25. In this manner both the beater and the fan are driven from shaft 92. Shaft 110 extends through the recleaner, and has a small pulley 111, Fig. 2, driving, through a belt 112, Fig. 1, larger pulleys 113 and 114, respectively on augers 27 and 23, auger 27 driving elevator 28 in the usual or a suitable manner.

Another pulley 115 fixed on shaft 92, on the stubble side of the machine, drives, through a belt 116, a pulley 117 on the shaft 118 of cleaner fan 17, and a small pulley 121 on the shaft 122 of cleaner auger 21, the auger driving elevator 22 in the usual or a suitable manner. Another small pulley 123, also on shaft 118, drives a pulley 124 on a crankshaft 125, through a belt 126, the crankshaft being connected for vibrating the racks 13 and 18, and sieve 16 in the usual or a suitable manner.

The operation of the machine is thought to be readily understood from the above description, but it may be pointed out that the combine is drawn behind and at one side of the tractor, as is apparent from Fig. 2, the mechanism being operated at the required speeds by the power take-off through the various drives outlined. Reel 8 urges the standing crop into contact with the cutter-bar 2, the reel also sweeping the cut material, including any heads or grain that may have been dislodged by impact with the reel or other parts of the machine, over the platform 3 and into a mass in front of cylinder 9, following material pushing the mass gradually and uniformly into position to be drawn into the cylinder where it is threshed. Any material tending to adhere to the reel is dislodged by stripper roll 10.

Grain and straw, after passing between the cylinder and concave 11, is carried by its momentum, assisted by beater 14, up the inclined floor 12 from which it passes to the straw racks 13 and 18, the straw passing out through the hood 19, while the grain falls through to pan 15 and is cleaned at the shoe 16.

The clean grain is elevated in elevator 22 and recleaned in recleaner 24, after which it is raised in elevator 28 to bin B from which it may be drawn from time to time as the machine progresses through the field.

Loss of grain by cross wind is largely prevented by hood 5, which encloses a major portion of the reel and loss of grain by rolling down the platform is prevented by the sweeps 87 or 89. The smooth contour of the enclosed reel substantially prevents tangling or winding of material on the reel. Breakage of the reel or platform is prevented by counterbalancing springs 77, and the whole structure is well adapted to the realization of the above stated objects.

The present embodiment is to be understood as illustrative rather than restrictive, and the invention is not to be taken as limited by the structure disclosed, or in fact in any manner except as defined in the following claims.

What is claimed as new and desired to be secured by Letters Patent of the United States is:

1. In a combine a threshing cylinder located low down in the combine, a platform leading to the vicinity of the cylinder, a cutter-bar at the front edge of the platform, and a reel arranged to urge grain into contact with the cutter-bar, said reel having a plurality of flexible elements arranged to sweep the platform and sweep grain threshed prematurely by contact with any machine parts across the platform and into contact with the cylinder.

2. In a harvesting machine a platform, a cutter-bar at the front edge of the platform, a reel arranged to direct material to the cutter-bar and to sweep material cut thereby onto the platform, and stationary housing means supported from the harvesting machine separately from the reel, enclosing the reel above and at the ends thereof whereby to shield the reel and material being acted upon from interference by the wind.

3. In a harvesting machine a platform, a cutter-bar on the front edge of the platform, a reel supported above the platform and arranged to urge material against the cutter-bar and to sweep material cut by said cutter-bar over the platform, a stripping rotor adjacent to the reel on an axis parallel to the axis of the reel and arranged to strip material which may tend to lodge on the reel, said platform being pivoted about the axis of said stripping rotor to swing about said axis for up-and-down movement of said cutter-bar, and supporting means for the reel including members pivoted about said axis and movable dependently with said platform.

4. In a harvesting machine a platform, a cutter-bar on the front edge of the platform, a reel supported above the platform and arranged to urge material against the cutter-bar and to sweep material cut by said cutter bar over the platform, a pivot about which said platform is adjustable for up-and-down movement of the cutter-bar, a lever connected with the platform and movable about said pivot as a center, means for moving said lever for adjusting said platform, an arm extending from the pivot and movable thereabout, and arranged for supporting the reel at its outer end, and a connection between the lever and arm arranged to prevent relative movement thereof in one direction, but to permit movement in the opposite direction, whereby to support the reel in predetermined relation to the platform, while allowing it to rise in the event of the introduction of any excess material between the platform and reel.

5. In a harvesting machine a platform, a cutter-bar on the platform, a reel supported above the platform and arranged to urge material against the cutter-bar and to sweep material cut by the latter over the platform, a pivot about which said platform is adjustable for up-and-down movement of the cutter-bar, a lever connected with the platform and movable about said pivot as a center, means for moving said lever for adjusting said platform, an arm extending from the pivot and movable thereabout and arranged for supporting the reel at its outer end, a connection between the lever and arm arranged to prevent relative movement thereof in one direction and whereby said lever and arm may be moved in the opposite direction to support the reel in predetermined relation to the platform, and means between the lever and arm tending to move said arm and reel in the last mentioned direction to support part of the weight thereof allowing the reel to rise in the event of momentary accumulation of material between it and the platform without imposing the whole weight of the reel on the material and platform.

6. In a harvesting machine a platform, a cutter-bar on the front edge of the platform, a reel supported above the platform and arranged to urge material against the cutter bar and to sweep material cut by said cutter-bar over the platform, a stripping rotor adjacent to the reel on an axis parallel to the axis of the reel, said platform being pivoted about the axis of said stripping rotor to swing about said axis for up-and-down movement of said cutter-bar whereby to maintain predetermined relations between said stripping rotor and said platform during adjustments of the platform.

7. In a combine a threshing cylinder, a platform leading to the vicinity of the cylinder, a cutter-bar at the front edge of the platform, a reel arranged to urge grain into contact with the cutter-bar and to sweep material cut by the latter over the platform and into the cylinder, means for raising and lowering the platform, and connected means for raising and lowering the reel in consonance with movements of the platform, said means having a portion disposed to support the reel in predetermined relation to the platform, but so constituted as to provide for upward movement of the reel independently of the platform to accommodate any excess of material between the platform and reel.

8. In a combine a threshing cylinder, a platform leading to the vicinity of the cylinder, a cutter-bar at the front edge of the platform, a reel arranged to urge grain into contact with the cutter-bar and to sweep cut material over the platform and to the cylinder, and means for supporting the reel in predetermined relation to the platform, said means having a portion disposed to support the reel in predetermined relation to the platform but so constituted as to provide for upward movement of the reel to rise to accommodate any excess of material between the platform and the reel.

9. In a harvesting machine, a platform, a cutter-bar on the front edge of the platform and having a reciprocable sickle, a shaft parallel to the cutter bar, said platform being pivoted about said shaft for up-and-down movement of the cutter bar, means for rotating the shaft, a crank on the shaft, and a pitman on the crank and connected for reciprocating the sickle.

10. In a combine including a housing, a pivot supported in the housing, a feeding reel mounted in the housing, means mounted on the pivot and engaging the reel, and means associated with the pivot and adapted to rock the latter for actuating said engaging means to vertically adjust the reel in the housing.

11. In a combine including a housing embodying guides, a reel mounted in the housing, a pivot mounted in the housing, means mounted on the pivot and engaging the reel and cooperating with the guides, and means connected to the pivot and adapted to rock the latter for actuating the engaging means to vertically adjust the reel.

12. In a combine, a housing, a stripper embodying a shaft mounted in the housing, a platform connected to the shaft including cutting mechanism, a reel connected to the shaft, means connected to the shaft for actuating the cutting mechanism, and means associated with the shaft for rocking the platform to simultaneously vertically adjust said platform, reel and actuating mechanism.

13. In a combine including a housing, a platform having cutting mechanism thereon pivotally mounted in the housing, a feeding reel pivotally mounted in the housing, and means for actuating the pivotal connection of the platform and reel to vertically adjust them simultaneously, the pivotal mounting of said reel including stop means disposed to prevent downward movement of the reel beyond a predetermined point but so constituted as to provide for independent upward movement of the reel when rotating over accumulations of material on the platform.

14. In a combine including a housing, a feeding reel in the housing comprising a shaft, a frame composed of a plurality of radially extending elements mounted on the shaft, and a sheath separate from said housing and encasing said frame for the purpose described.

15. In a machine of the class described embodying a threshing and separating chamber, a cylinder in the chamber, a vertically adjustable platform in advance of the cylinder over which material is conveyed to the latter and into the chamber, cutting mechanism associated with the platform, means for actuating the cutting mechanism, a vertically adjustable feeding reel supported above the platform for propelling material between the platform and reel and feeding such material rearwardly to the cylinder, and means pivotally connected to the platform, reel and actuating means whereby said elements may be vertically adjusted.

16. In a combine a platform, cutting mechanism at the front of the platform for cutting material to fall on the platform, upwardly extending side wings on the platform, a rotary element having teeth extending downwardly between the side wings and arranged to sweep the platform, the spaces between the teeth, the platform and side wings forming therebetween substantially closed chambers moving rearwardly over the platform with the rotation of the reel to positively convey cut material over the platform and to deliver it at the rear thereof.

17. In a combine, a forwardly extending housing including a platform, a cutter bar at the forward edge of the platform, said housing embodying upwardly disposed guides, a reel mounted in the housing, means connected with the reel for supporting it within the housing, said means engaging and cooperating with the guides for positioning the reel at various points within the housing and means connected to the supporting means and adapted to raise and lower the latter for adjusting the position of the reel relatively to the platform within the housing.

SHERMAN C. HETH.
WILLIAM B. TALLMAN.